United States Patent
Hironishi et al.

(10) Patent No.: US 9,281,913 B2
(45) Date of Patent: Mar. 8, 2016

(54) SIGNAL DETECTION CIRCUIT AND OPTICAL TRANSMISSION EQUIPMENT

(71) Applicant: FUJITSU LIMITED, Kawasaki-shi, Kanagawa (JP)

(72) Inventors: Kazuo Hironishi, Yokohama (JP); Shoichiro Oda, Fuchu (JP); Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 88 days.

(21) Appl. No.: 14/107,450

(22) Filed: Dec. 16, 2013

(65) Prior Publication Data

US 2014/0219662 A1    Aug. 7, 2014

(30) Foreign Application Priority Data

Feb. 1, 2013    (JP) .................. 2013-018760

(51) Int. Cl.
| | |
|---|---|
| *H04B 10/17* | (2006.01) |
| *H04B 10/06* | (2006.01) |
| *H04J 14/02* | (2006.01) |
| *H04B 10/077* | (2013.01) |

(52) U.S. Cl.
CPC .......... *H04J 14/0201* (2013.01); *H04B 10/077* (2013.01); *H04J 14/0258* (2013.01); *H04J 14/0276* (2013.01); *H04B 2210/074* (2013.01); *H04B 2210/075* (2013.01)

(58) Field of Classification Search
CPC .. H04J 14/201; H04J 14/0258; H04J 14/0276
USPC ...................................... 398/43, 79, 203–205
See application file for complete search history.

(56) References Cited

U.S. PATENT DOCUMENTS

| | | | | |
|---|---|---|---|---|
| 5,515,197 | A | * | 5/1996 | Hooijmans et al. ........... 398/202 |
| 2004/0005150 | A1 | | 1/2004 | Takeshita |
| 2008/0199191 | A1 | * | 8/2008 | Essiambre et al. ............ 398/208 |
| 2012/0328297 | A1 | | 12/2012 | Hoshida |
| 2014/0219662 | A1 | * | 8/2014 | Hironishi et al. ............... 398/79 |

FOREIGN PATENT DOCUMENTS

| | | |
|---|---|---|
| JP | 2004-40668 A | 2/2004 |
| JP | 2013-009238 A | 1/2013 |

* cited by examiner

*Primary Examiner* — Oommen Jacob
(74) *Attorney, Agent, or Firm* — Fujitsu Patent Center

(57) ABSTRACT

A signal detection circuit includes: a first optical filter configured to filter an optical signal carrying a frequency modulated signal with a first transmission band; a second optical filter configured to filter the optical signal with a second transmission band; a first photo detector configured to convert the output light of the first optical filter into a first electrical signal; a second photo detector configured to convert the output light of the second optical filter into a second electrical signal; a difference circuit configured to output a signal representing a difference between the first electrical signal and the second electrical signal; and a detector configured to detect the frequency modulated signal based on the output signal of the difference circuit.

6 Claims, 14 Drawing Sheets

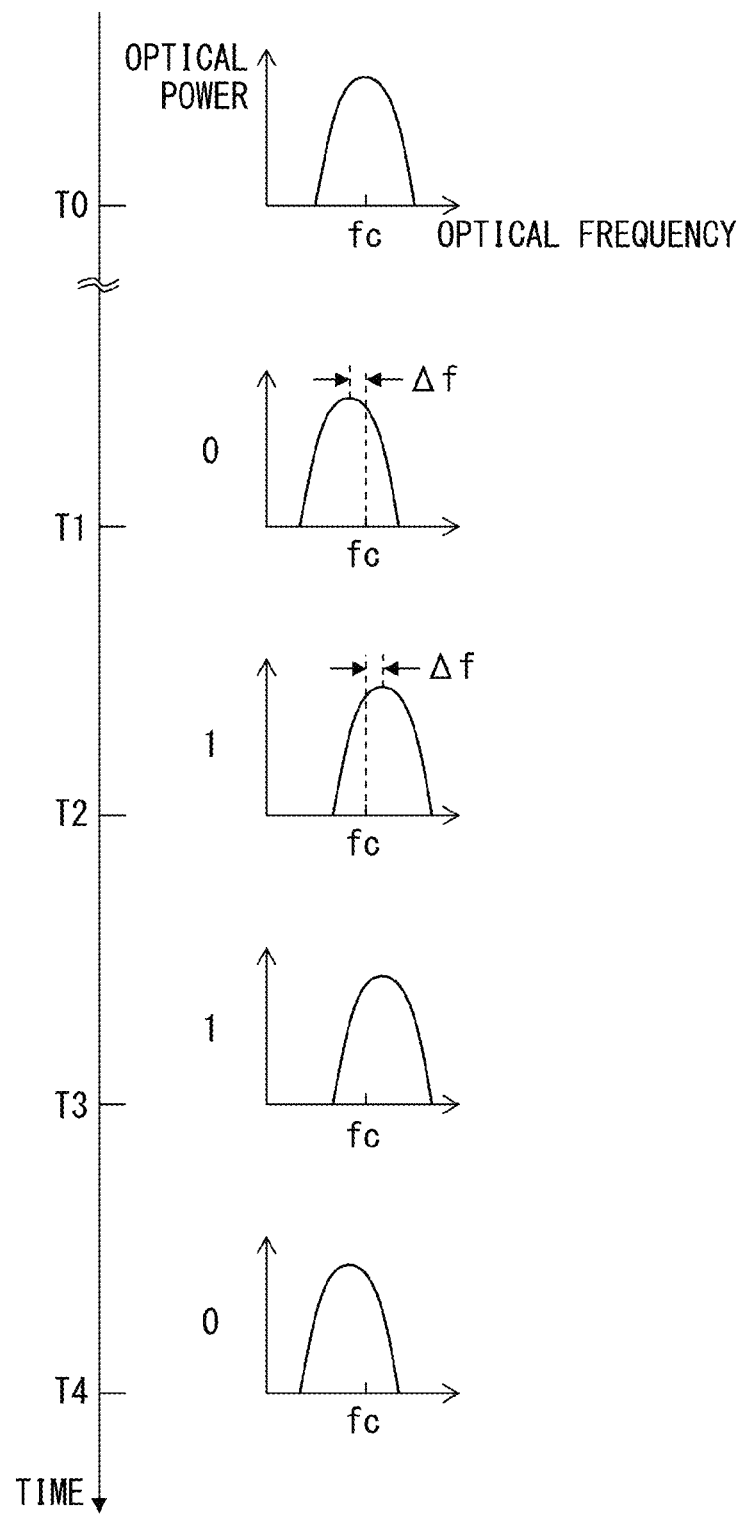
F I G. 4

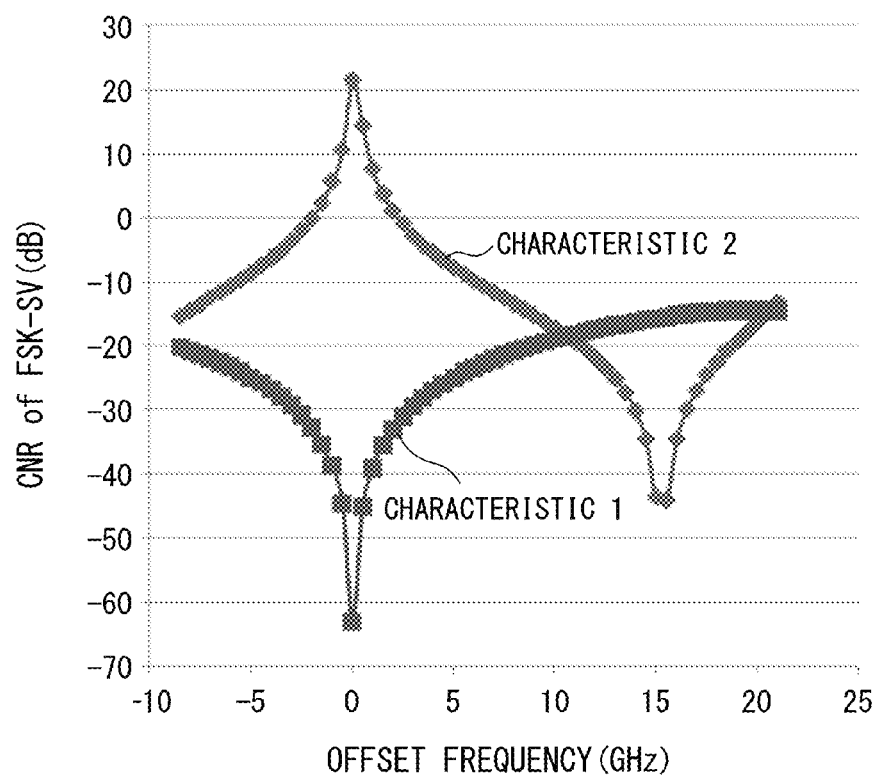
F I G. 8

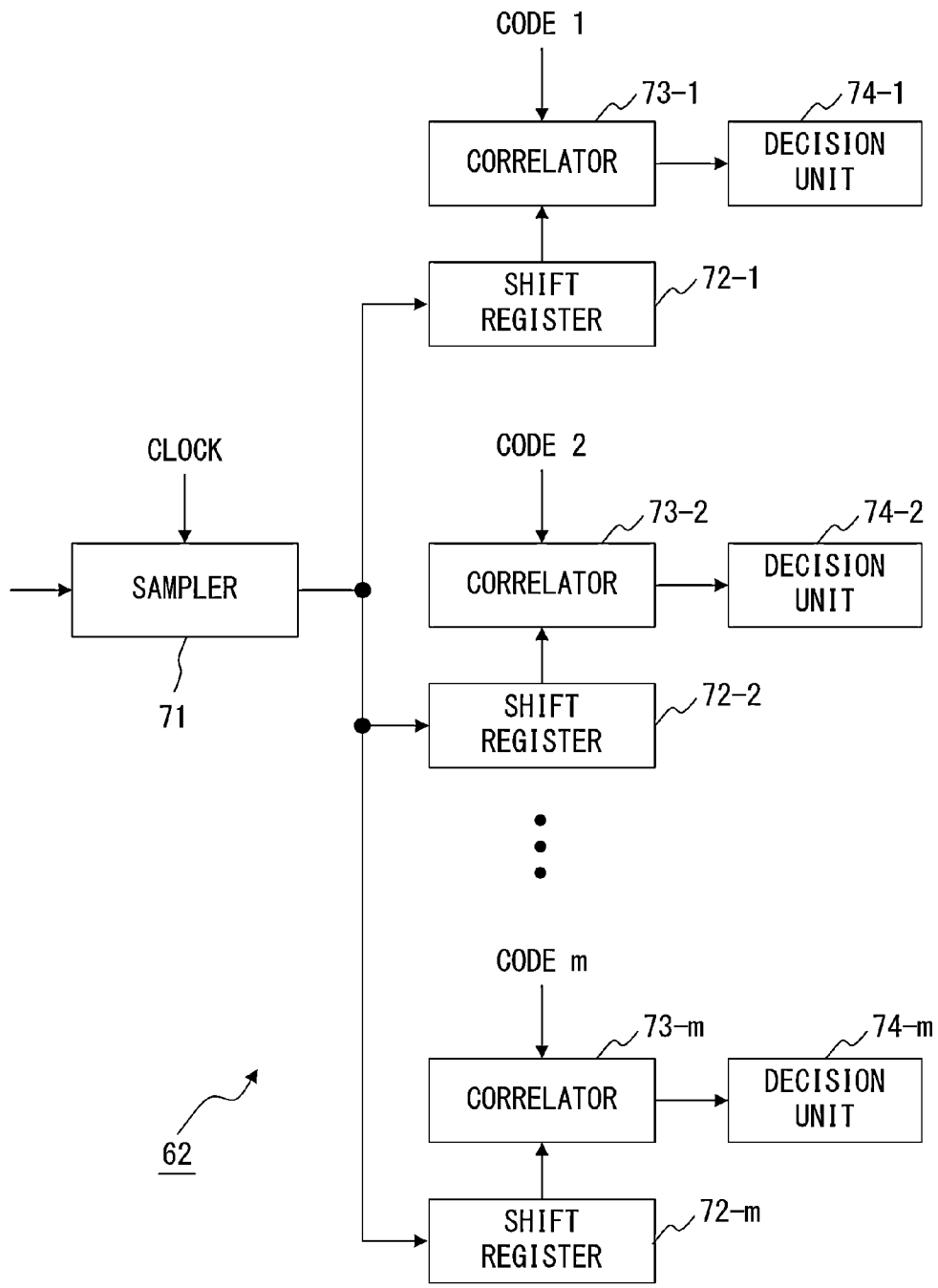
F I G. 1 0

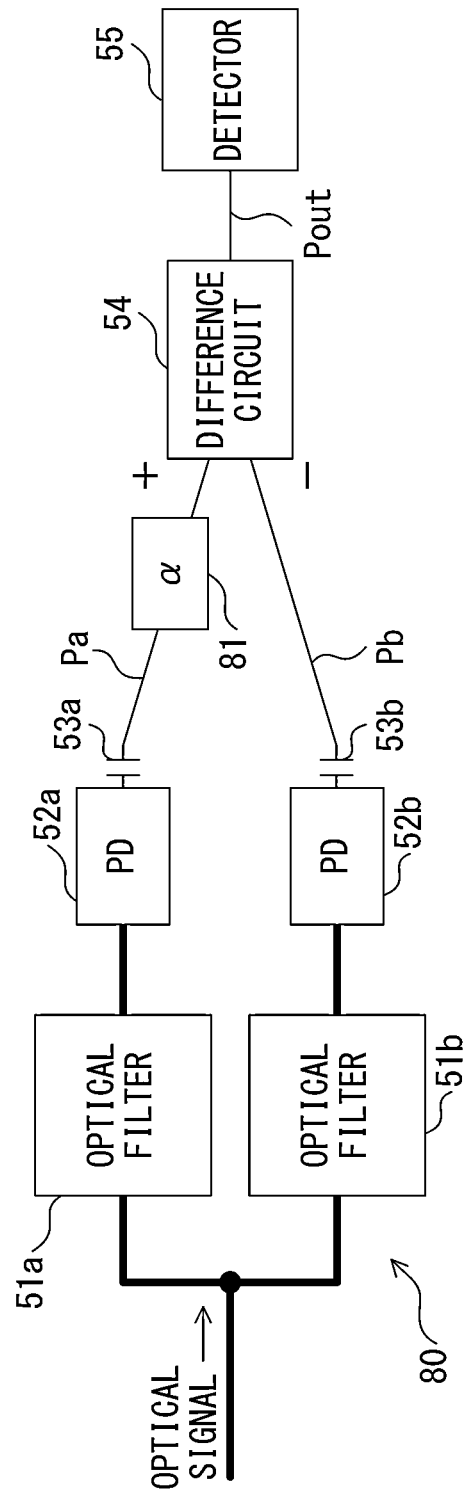
F I G. 1 1

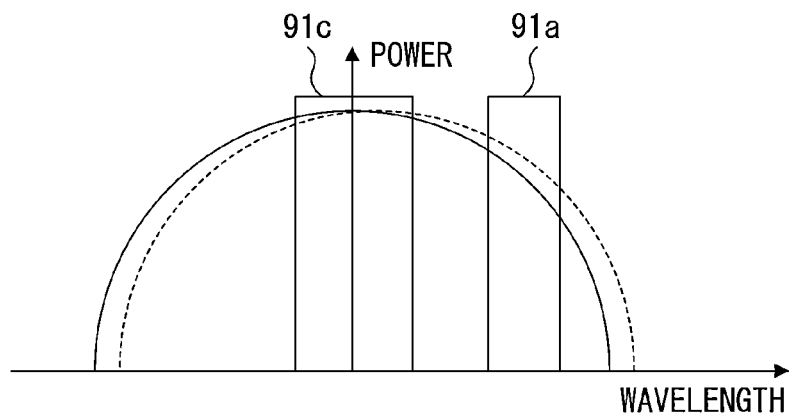
F I G. 1 3

SIGNAL DETECTION CIRCUIT AND OPTICAL TRANSMISSION EQUIPMENT

CROSS-REFERENCE TO RELATED APPLICATION

This application is based upon and claims the benefit of priority of the prior Japanese Patent Application No. 2013-018760, filed on Feb. 1, 2013, the entire contents of which are incorporated herein by reference.

FIELD

The embodiments discussed herein are related to a detection circuit that detects a frequency modulated signal from an optical signal and optical transmission equipment that has a function to detect a frequency modulated signal.

BACKGROUND

In an optical transmission system, there is known a technique of superimposing a control signal, such as a supervisory signal, on an optical signal used for transmission of data. For example, in a WDM transmission system, there is a case where a control signal for identifying an optical path is superimposed on each of optical signals in a WDM signal. In this case, node equipment or a receiver may recognize the transmission source of the optical signal and the route of the optical signal by detecting the control signal from the received optical signal.

In the above described optical transmission system, the data of respective channels are transmitted, for example, by a multi-level modulation scheme, such as QPSK and mQAM (where m is 16, 64 or 256). On the other hand, the control signal, such as a supervisory signal, is superimposed on the optical signal, for example, by frequency modulation.

As a related technique, an optical signal transmission system has been proposed, which can monitor the correspondence between a transmission source and a transmission destination of a signal without causing quality degradation of the main optical signal and without performing O/E conversion of the main optical signal (see, for example, Japanese Laid-Open Patent Publication No. 2004-40668).

In the case where the control signal is superimposed on the optical signal by frequency modulation, the receiver detects the control signal, for example, by converting frequency modulated components of the optical signal into amplitude components. However, in this case, when the frequency modulated components used for superimposing the control signal on the optical signal is large (than is, when the frequency variation width is large), the qualify (for example, error rate) of the data carried by the optical signal may be deteriorated. For this reason, it is preferred that the frequency modulated components used for superimposing the control signal on the optical signal be controlled to be sufficiently small so as to prevent the deterioration of data quality.

When the frequency modulated components on the optical signal is small, the amplitude components obtained from the frequency modulated components in the receiver is also small. In this case, the amplitude components obtained from the frequency modulated components of the optical signal are easily influenced by AM noise generated in the optical transmission path between the transmitter and the receiver. Therefore, the detection sensitivity of the control signal in the receiver decreases.

SUMMARY

According to an aspect of the embodiments, a signal detection circuit includes: a first optical filter configured to filter an optical signal carrying a frequency modulated signal with a first transmission band; a second optical filter configured to filter the optical signal with a second transmission band; a first photo detector configured to convert the output light of the first optical filter into a first electrical signal; a second photo detector configured to convert the output light of the second optical filter into a second electrical signal; a difference circuit configured to output a signal representing a difference between the first electrical signal and the second electrical signal; and a detector configured to detect the frequency modulated signal based on the output signal of the difference circuit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a view for illustrating frequency modulation;

FIG. 8 is a view for illustrating the effect of the first embodiment;

FIG. 10 illustrates an example of a detector used in the second embodiment;

FIG. 11 illustrates a configuration of a signal detection circuit of a third embodiment;

FIG. 13 illustrates a modification example of the fourth embodiment; and

DESCRIPTION OF EMBODIMENTS

Figure 1:
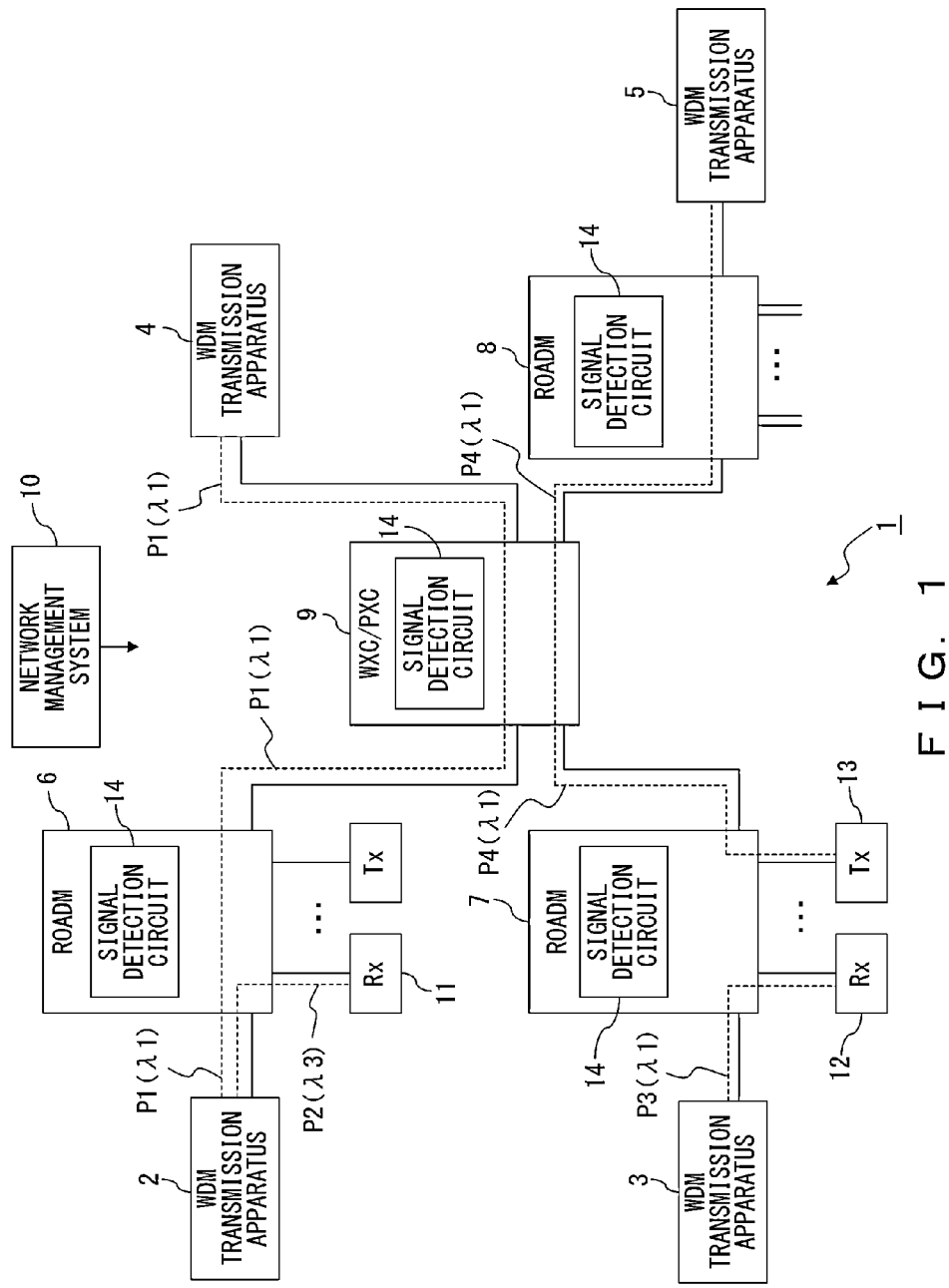
FIG. 1 illustrates an example of an optical transmission system.

FIG. 1 illustrates an example of an optical transmission system in which a signal detection circuit according to embodiments of the present invention is used. An optical transmission system 1 illustrated in FIG. 1 includes WDM transmission equipment 2-5, reconfigurable optical add/drop multiplexers (ROADMs) 6-8, a wavelength cross connect (WXC) (or photonic cross connect (PXC)) 9, and a network management system (NMS) 10.

The WDM transmission equipment 2, 3 and 5 are connected to the reconfigurable optical add/drop multiplexers 6, 7 and 8 via the optical fiber links, respectively. The reconfigurable optical add/drop multiplexers 6, 7 and 8 are connected to the wavelength cross connect 9 via optical fiber links, respectively. The WDM transmission equipment 4 is connected to the wavelength cross connect 9 via an optical fiber link. Note that one or more optical amplifiers may be provided on each of the optical fiber links.

Each of the WDM transmission equipment 2-5 transmits and receives a WDM optical signal including a plurality of optical signals having different wavelengths. Each of the reconfigurable optical add/drop multiplexers 6-8 may transmit an optical signal of a specified wavelength channel among the received WDM optical signal. Further, each of the reconfigurable optical add/drop multiplexers 6-8 may branch an optical signal having a specified wavelength among the received WDM optical signal and guides the branched optical signal to a client circuit. Further, each of the reconfigurable optical add/drop multiplexers 6-8 may insert, into a WDM optical signal, an optical signal inputted from a client circuit. The wavelength cross connect 9 includes a plurality of input ports and a plurality of output ports, and guides an input signal to an output port so as to realize a specified optical path. Note that, although not clearly indicated, the wavelength cross connect 9 may have a function of branching an optical signal to a client circuit, and a function of inserting an optical signal into a WDM optical signal similarly to the reconfigurable optical add/drop multiplexers 6-8.

In the optical transmission system 1, the network management system 10 provides an optical path designated by a user. That is, the network management system 10 controls the WDM transmission equipment 2-5, the reconfigurable optical add/drop multiplexers 6-8, and the wavelength cross connect 9 so as to realize the optical path designated by the user.

In the example illustrated in FIG. 1, optical paths P1 to P4 are provided in the optical transmission system 1. Each of the optical paths is represented by a broken line. The optical path P1 transmits an optical signal from the WDM transmission equipment 2 to the WDM transmission equipment 4 via the reconfigurable optical add/drop multiplexer 6 and the wavelength cross connect 9. The optical path P2 transmits an optical signal from the WDM transmission equipment 2 to a client 11 via the reconfigurable optical add/drop multiplexer 6. The optical path P3 transmits an optical signal from the WDM transmission equipment 3 to a client 12 via the reconfigurable optical add/drop multiplexer 7. The optical path P4 transmits an optical signal from a client 13 to the WDM transmission equipment 5 via the reconfigurable optical add/drop multiplexer 7, the wavelength cross connect 9, and the reconfigurable optical add/drop multiplexer 8. Note that each of the optical paths P1 to P4 may bi-directionally transmit optical signals.

In the optical transmission system 1 configured as described above, the network management system 10 may assign a same wavelength to different optical paths in order to efficiently or flexibly use communication resources. In the example illustrated in FIG. 1, wavelengths λ1, λ3, λ1 and λ1 are assigned to the optical paths P1, P2, P3 and P4, respectively.

A user or a network administrator sometimes wants to check whether or not the optical paths are correctly implemented. However, when the same wavelength is assigned to a plurality of optical paths, it is difficult to identify each of the optical paths only by monitoring the spectrum of each of the wavelength channels. For example, in the wavelength cross connect 9, it is difficult to identify the optical paths P1 and P4 only by monitoring the spectrum of each of the wavelength channels.

Thus, the network management system 10 assigns a path ID to each of the optical paths. By so doing, a transmission source apparatus of an optical path superimposes a supervisory signal representing a path ID on an optical signal to be transmitted via the optical path. For example, the WDM transmission equipment 2 superimposes a supervisory (SV) signal representing "path ID=1" on an optical signal to be transmitted via the optical path P1, and superimposes a supervisory signal representing "path ID=2" on an optical signal to be transmitted via the optical path P2. In this example, the supervisory signal is superimposed on the optical signal by frequency modulation.

Optical transmission equipment includes a signal detection circuit 14 that detects a supervisory signal superimposed on an optical signal and acquires a path ID from the supervisory signal. In the example illustrated in FIG. 1, the optical transmission equipment corresponds to the reconfigurable optical add/drop multiplexers 6-8 and the wavelength cross connect 9. However, the signal detection circuit 14 need not necessarily be provided at all of the optical transmission equipment, and a plurality of the signal detection circuits 14 may be provided at one optical transmission equipment. Also, the signal detection circuit 14 may be implemented within the optical transmission equipment or may be configured to be connected to the optical transmission equipment. Further, the signal detection circuit 14 may be provided at the WDM transmission equipment 2-5.

Figure 2:
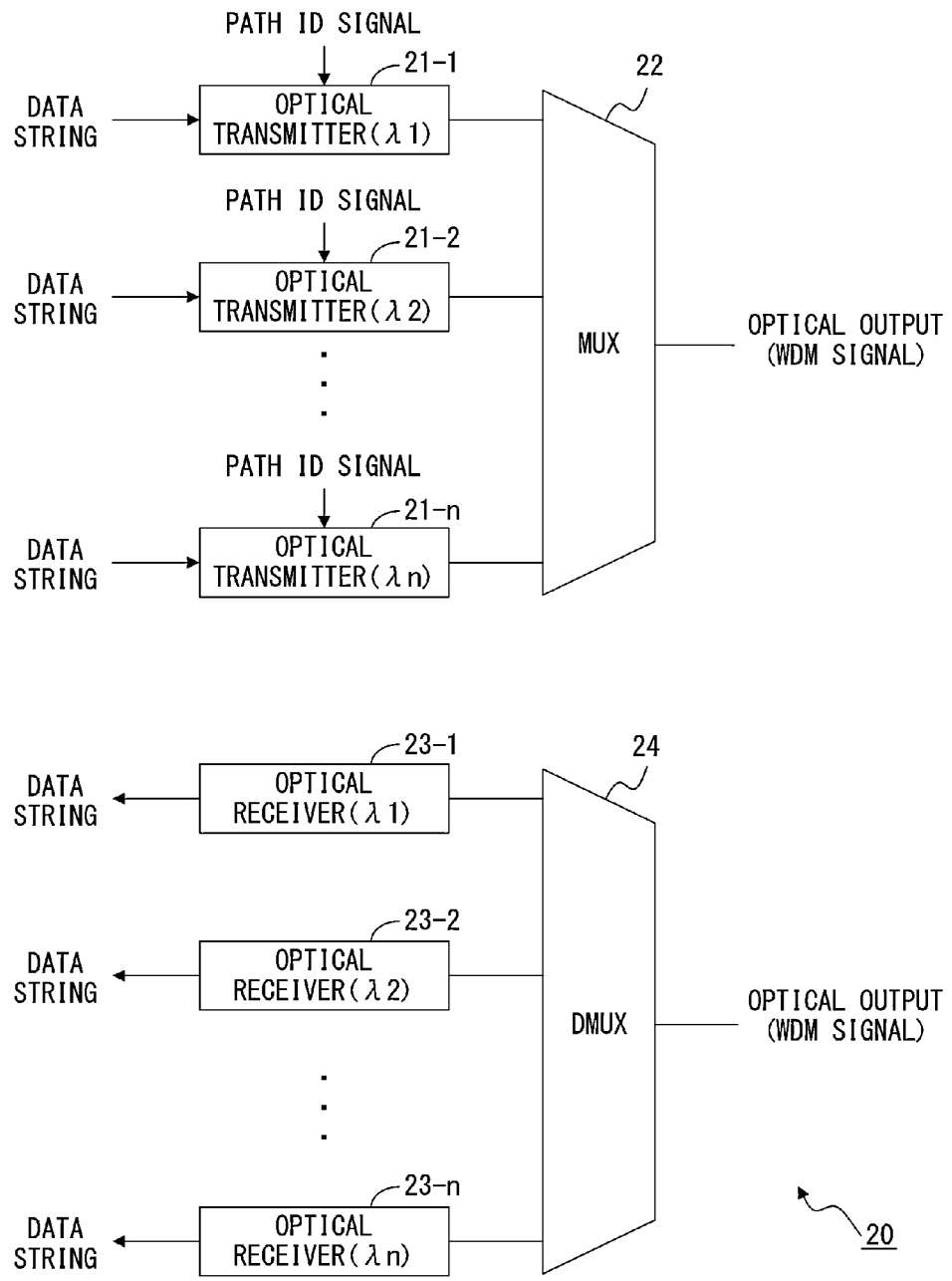
FIG. 2 illustrates a configuration of WDM transmission equipment.

FIG. 2 illustrates a configuration of WDM transmission equipment. In the example illustrated in FIG. 1, WDM transmission equipment 20 illustrated in FIG. 2 corresponds to the WDM transmission equipment 2-5. The WDM transmission equipment 20 includes optical transmitters 21-1 to 21-$n$, a multiplexer 22, optical receivers 23-1 to 23-$n$, and a demultiplexer 24.

Each of the optical transmitters 21-1 to 21-$n$ generates an optical signal by modulating carrier light with an input data string. The wavelengths λ1 to λ$n$ of the carrier light respectively used by the optical transmitters 21-1 to 21-$n$ are different from each other (that is, different optical frequencies). The network management system 10 assigns path IDs to each of the optical transmitters 21-1 to 21-$n$. The path ID is given as a supervisory signal to each of the optical transmitters 21-1 to 21-$n$. The supervisory signal is, for example, a code having a specified length. In this case, the codes for identifying the respective optical paths are orthogonal to each other when the optical transmitters 21-1 to 21-$n$ are used with a detector illustrated in FIG. 10. Further, the supervisory signals may be tone signals having mutually different frequencies. The tone signal is not limited in particular and is, for example, a sine wave signal. Note that the rate (the bit rate of the code, the frequency of the tone signal, and the like) of the supervisory signal is sufficiently low as compared with the rate of the data string.

Each of the optical transmitters 21-1 to 21-$n$ can superimpose a supervisory signal on an optical signal by frequency modulation. That is, each of the optical transmitters 21-1 to 21-$n$ can output an optical signal with a supervisory signal superimposed by frequency modulation. Further, the multiplexer 22 multiplexes the optical signals outputted from the optical transmitters 21-1 to 21-$n$ to generate a WDM optical signal.

Note that the modulation schemes respectively used by the optical transmitters 21-1 to 21-$n$ for modulating main signal data strings may not be the same as one another. For example, the WDM transmission equipment may be configured such that the optical transmitter 21-1 transmits a QPSK modulated optical signal, and the optical transmitter 21-2 transmits a 16 QAM modulated optical signal. Further, the symbol rate or the bit rate of optical signals respectively outputted from the optical transmitters 21-1 to 21-n may not be the same as one another.

The demultiplexer 24 demultiplexes a WDM optical signal received via a transmission line, and outputs optical signals corresponding to the optical receivers 23-1 to 23-n. Each of the optical receivers 23-1 to 23-n recovers a data string by demodulating corresponding optical signal.

Figure 3A:
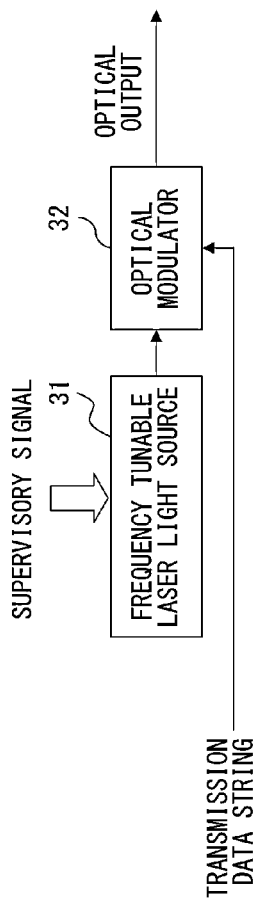
FIGS. 3A and 3B illustrate examples of an optical transmitter that has a function to superimpose a supervisory signal.
Figure 3B:
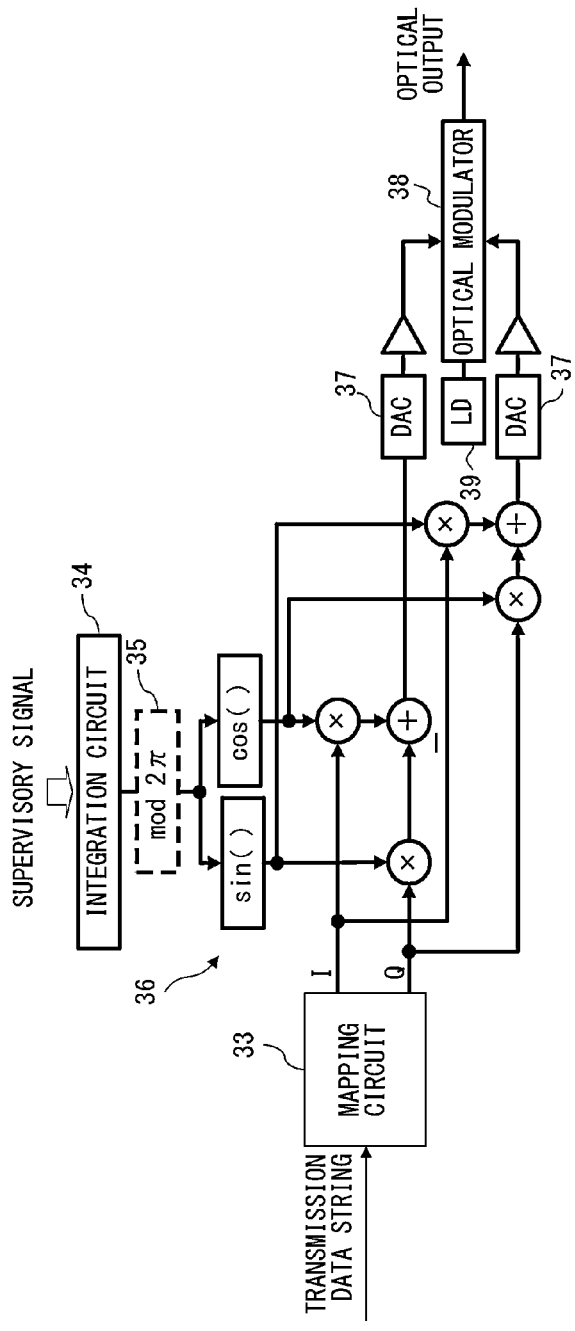

FIGS. 3A and 3B illustrate examples of an optical transmitter that has a function to superimpose a supervisory signal. The optical transmitter illustrated in FIGS. 3A and 3B is an example of the optical transmitters 21-1 to 21-n illustrated in FIG. 2. However, the configuration of superimposing a supervisory signal on an optical signal with frequency modulation is not limited to the configuration or the method illustrated FIG. 3A or FIG. 3B.

The optical transmitter illustrated in FIG. 3A includes a frequency tunable laser light source 31 and an optical modulator 32. The frequency tunable laser light source 31 generates continuous wave light having an oscillation frequency corresponding to a frequency control signal. Therefore, when a supervisory signal is given as the frequency control signal, the frequency tunable laser light source 31 generates continuous wave light having the oscillation frequency corresponding to the supervisory signal. The optical modulator 32 modulates, with a transmission data string, the continuous wave light generated by the frequency tunable laser light source 31. As a result, the optical signal is generated with the supervisory signal superimposed by frequency modulation.

The optical transmitter illustrated in FIG. 3B realizes the frequency modulation based on digital signal processing. That is, a mapping circuit 33 maps a transmission data string to an I component data string and a Q component data string. An integration circuit 34 integrates the supervisory signal. Note that, in the configuration illustrated, in FIG. 3B, the supervisory signal f(t) is a digital data string representing an amplitude time waveform of a code or a tone signal. Further, the integration circuit 34 outputs, as an integration result, phase information θ(t) described below.

$$\theta(t) = \int 2\pi f(t) dt$$

A mod 2π circuit 35 converts the output value of the integration circuit 34 into a value within the range of 0 to 2π. However, when the integration circuit 34 is designed to have the output range of 0 to 2π, the mod 2π circuit 35 can be omitted.

A rotation operation circuit 36 rotates the I component data string and the Q component data string by the following operation using the phase information θ(t). Reference characters I and Q denote input data of the rotation operation circuit 36. Further, reference characters I' and Q' are output data of the rotation operation circuit 36.

$$I' = I \cos \theta(t) - Q \sin \theta(t)$$

$$Q' = I \sin \theta(t) + Q \cos \theta(t)$$

The data I' and the data Q', which are obtained by the rotation operation circuit 36, are respectively converted into analog signals by D/A converters 37, and given to an optical modulator 38. The optical modulator 38 generates a modulated optical signal by modulating, with the data I' and the data Q', the continuous wave light outputted from a laser light source 39. As a result, an optical signal is generated with the supervisory signal superimposed by frequency modulation.

FIG. 4 is a view for illustrating frequency modulation. FIG. 4 illustrates time-resolved output spectra of the optical transmitter at time points of T0, T1 to T4. The spread of the output optical spectrum at each of the time points represents a spread of spectrum caused by the modulation based on the transmission data string, and can take various widths and shapes according to the modulation scheme and modulation rate of the main optical signal. As described with reference to FIGS. 3A and 3B, a supervisory signal is superimposed by frequency modulation on an optical signal outputted from the optical transmitter. In the example illustrated in FIG. 4, the supervisory signal is a digital code. The code superimposed on the optical signal at the time points of T1 to T4 is "0110". Further, the center frequency of the carrier light used by the optical transmitter is fc.

At time point T0, no supervisory signal is superimposed on the optical signal. In this case, the optical transmitter does not shift the center frequency of the optical signal. Therefore, the center frequency of the spectrum of the optical signal outputted at time point T0 is fc.

At time point T1, "0" is superimposed on the optical signal. In this case, in this example, the optical transmitter shifts the frequency of the optical signal by −Δf. Therefore, the center frequency of the spectrum of the optical signal outputted at time point T1 is fc−Δf.

At time point T2, "1" is superimposed on the optical signal. In this case, in this example, the optical transmitter shifts the frequency of the optical signal by +Δf. Therefore, the center frequency of the spectrum of the optical signal outputted at time point T2 is fc+Δf. Similarly, the center frequency of the spectrum of the optical signal outputted at time point T3 is fc+Δf, and the center frequency of the spectrum of the optical signal outputted at time point T4 is fc−Δf.

The frequency shift Δf is sufficiently small as compared with the frequency of carrier light. Further, Δf is determined so as not to interfere with the adjacent channel of the WDM transmission system. For example, in the WDM transmission system in which wavelength channels are arranged on a 50 GHz/100 GHz frequency grid specified by ITU-T, Δf is not limited in particular but is set to about 1 MHz to 1 GHz.

In the example illustrated in FIG. 4, the frequency shift, at the time when the supervisory signal is "0" or "1", is respectively set to "−Δf" or "+Δf", but the present invention is not limited to this method. For example, the frequency shift, at the time when the supervisory signal is "0" or "1", may respectively be set to "+Δf" or "−Δf". Further, it may also be configured such that, when the supervisory signal is "0" (or "1"), the frequency shift is set to 0, and such that, when the supervisory signal is "1" (or "0"), the optical frequency is shifted. Further, a supervisory signal may be superimposed on an optical signal by using multi-level frequency shift keying other than binary frequency shift keying.

Note that, although the supervisory signal is a digital signal in the example illustrated in FIG. 4, the method for shifting the optical frequency is also substantially the same as the method used in the case where the supervisory signal is an analog signal. However, when the supervisory signal is an analog signal, the amount of the frequency shift is not discretely changed but is continuously changed.

Figure 5A:
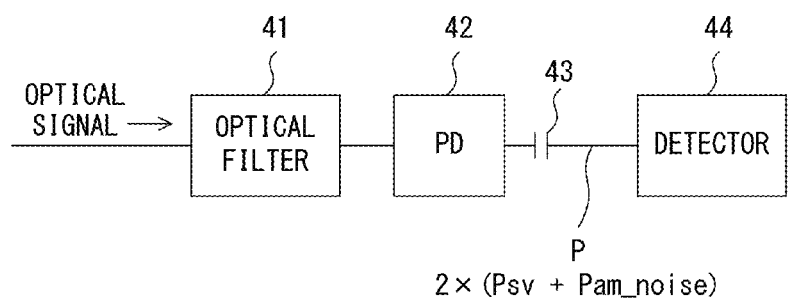
FIGS. 5A and 5B are views for illustrating detection of frequency modulated signals.
Figure 5B:
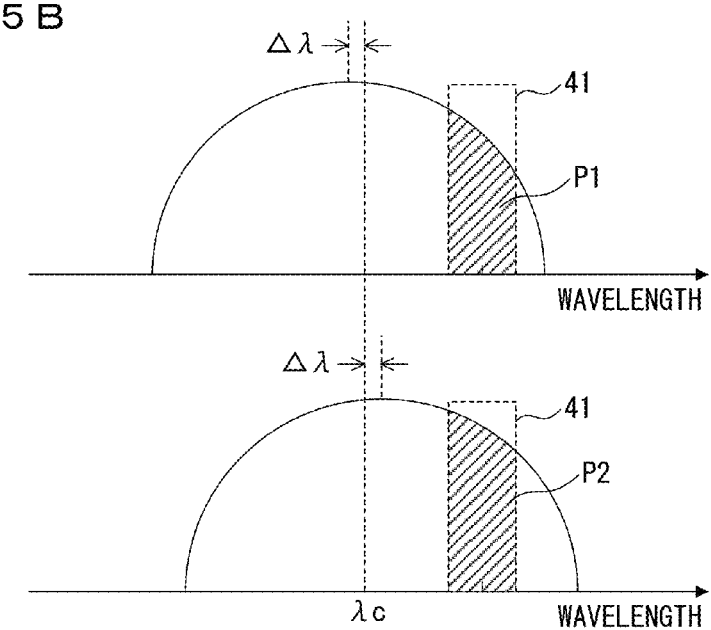

FIGS. 5A and 5B are views for illustrating detection of a frequency modulated signal. Here, an optical signal carries a data signal and a supervisory signal. As described above, the supervisory signal is superimposed (or multiplexed) on the optical signal with frequency modulation. That is, the supervisory signal is an example of a frequency modulated signal (or FSK signal). Therefore, in the following description, a supervisory signal may be referred to as an "FSK-SV signal". Note that the center wavelength of this optical signal is λc.

For example, as illustrated in FIG. 5A, a circuit, that detects an FSK-SV signal from the above-described optical signal, includes an optical filter 41, a photo detector 42, a DC-removal capacitor 43, and a detector 44. Further, an input optical signed is guided to the optical filter 41.

As described above, the FSK-SV signal is multiplexed into the input optical signal with frequency modulation. For this reason, as illustrated in FIG. 5B, the center wavelength of the optical signal is changed in the range between λc−Δλ and λc+Δλ according to the FSK-SV signal. FIG. 5B illustrates spectra of the optical signal, and the transmission band (or pass band) of the optical filter 41.

The photo detector 42 converts the light outputted from the optical filter 41 (that is, the optical signal filtered by the optical filter 41) into an electrical signal. The electrical signal represents the power of the light outputted from the optical filter 41. Here, the power of the light outputted from the optical filter 41 is represented by the area of the hatched region illustrated in FIG. 5B. That is, when the center wavelength of the optical signal is λc−Δλ, the power of the light outputted from the optical filter 41 is expressed as P1, while when the center wavelength of the optical signal is λc+Δλ, the power of the light outputted from the optical filter 41 is expressed as P2.

The DC-removal capacitor 43 removes DC component from the electrical signal generated by the photo detector 42. Therefore, the electrical signal outputted from the DC-removal capacitor 43 represents the FSK-SV signal converted into an amplitude component. Note that the data signal is assumed to be averaged, for example, by (high frequency band side) electrical band limitation of the photo detector 42 or by a low pass filter (not illustrated). Alternatively, when the operation speed of the photo detector 42 is sufficiently low as compared with the symbol rate of the data signal, the data signal is averaged by the photo detector 42. The averaged data signal is substantially removed by the DC-removal capacitor 43. The detector 44 detects the FSK-SV signal from the output signal of the DC-removal capacitor 43.

However, the input optical signal includes AM noise. The AM noise is added to the optical signal, for example, in the transmission line between the optical transmitter and the optical receiver. Therefore, the signal P inputted to the defector 44 is expressed by the following expression. Note that 2×Psv represents an amplitude component resulting from the FSK-SV signal. 2×Pam_noise represents AM noise. Note that, each of the amplitude component and the AM noise is expressed by being multiplied by 2 for consistency with the following description.

$$P = 2 \times (Psv + Pam\_noise)$$

The detector 44 detects the FSK-SV signal by detecting 2×Psv from the signal P. Therefore, when Pam_noise is small as compared with Psv, the detector 44 can detect the FSK-SV signal with sufficient accuracy.

The magnitude of Psv depends on the frequency variation range (Δf in the example illustrated in FIG. 4) of the FSK-SV signal. However, when the frequency variation range of the FSK-SV signal is large, the quality (for example, error rate) of data carried by the optical signal may be deteriorated. For this reason, the frequency variation range of the FSK-SV signal is controlled to be small so as to prevent deterioration of the quality of data. Thus, it is difficult to increase the magnitude of Psv. That is, it is difficult to sufficiently increase the magnitude of Psv with respect to Pam_noise.

Figure 6:
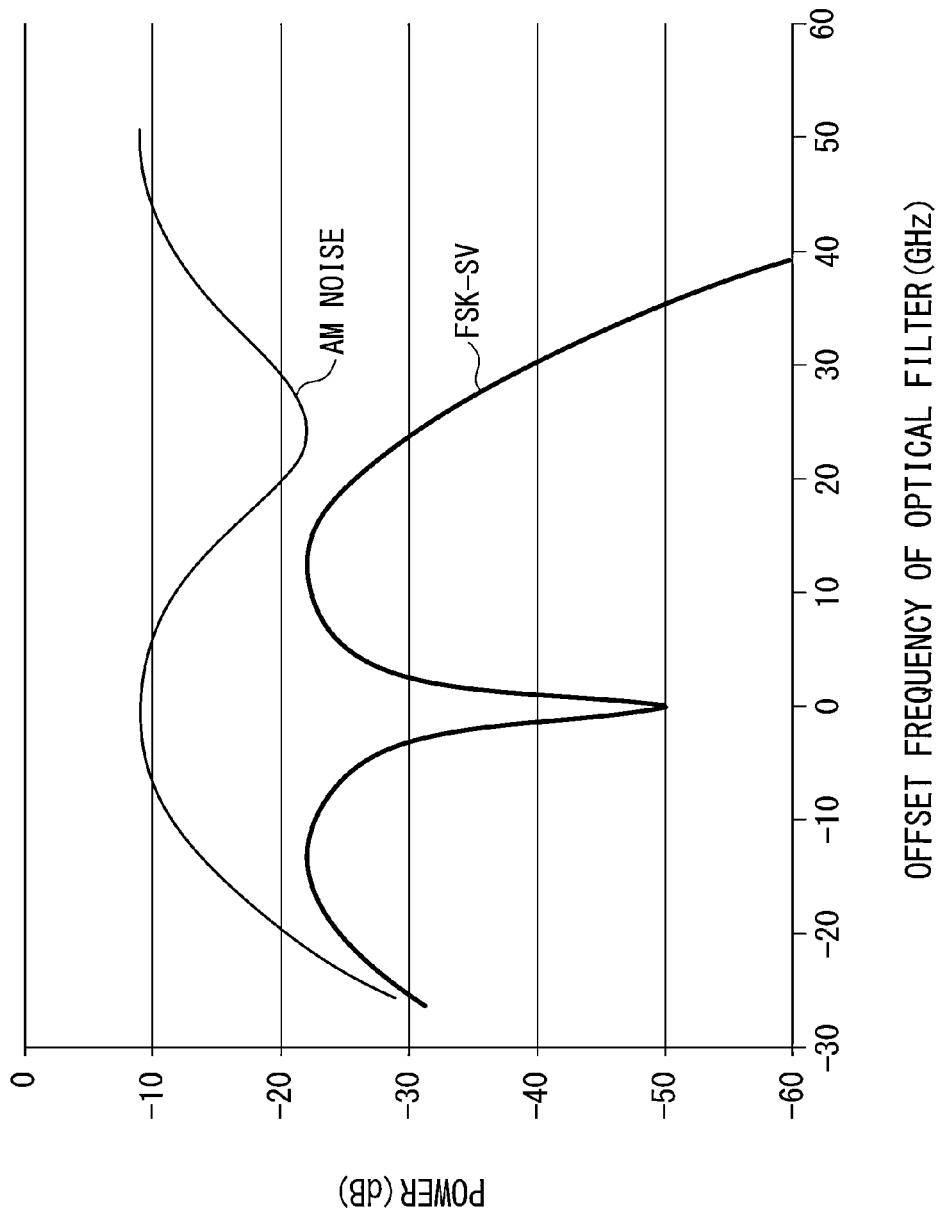
FIG. 6 illustrates simulation results about the power of converted amplitude output of a FSK-SV signal and the power of AM noise.

FIG. 6 illustrates simulation results about the power of converted amplitude output of FSK-SV signal and the power of AM noise. The horizontal axis represents the difference (that is, offset frequency) between the center frequency of the optical signal and the center frequency of the transmission band of the optical filter 41. The frequency variation range of the FSK-SV signal is 100 MHz. The modulation depth of the AM noise is 2 percent. The width of the transmission band of the optical filter 41 is 20 GHz.

According to the simulation, the amplitude component of the FSK-SV signal is smaller than the AM noise. For example, even when the offset frequency is controlled so as to maximize the amplitude component of the FSK-SV signal, the amplitude component of the FSK-SV signal is smaller by about 7 dB than the AM noise. Therefore, it is difficult that the detection circuit illustrated in FIG. 5A detects the FSK-SV signal with sufficient sensitivity.

Figure 7A:
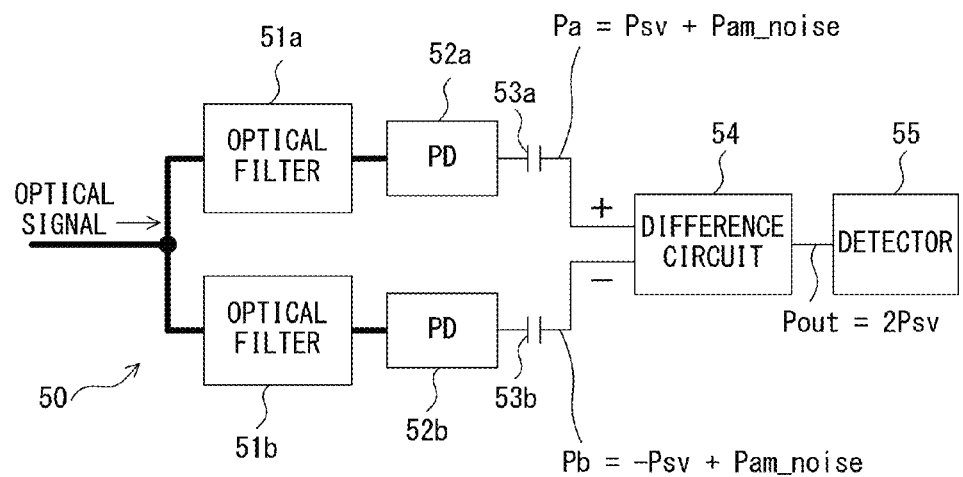
FIGS. 7A and 7B are views for illustrating a configuration and operation of a signal detection circuit of a first embodiment.
Figure 7B:
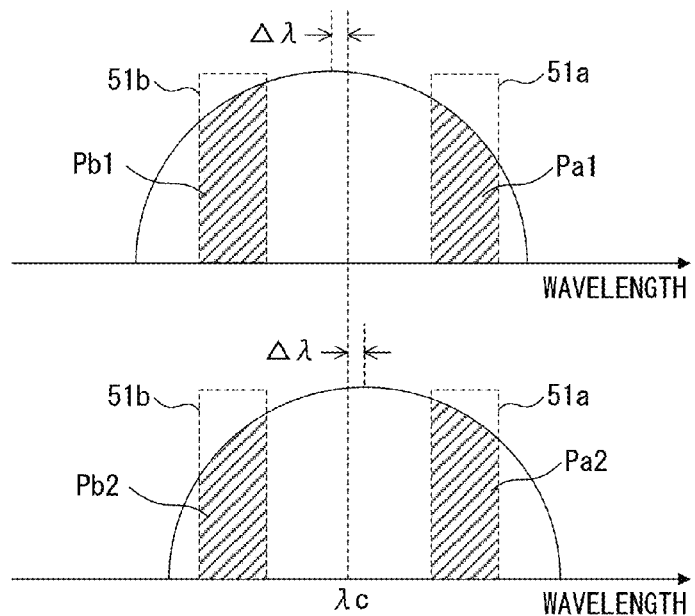

FIGS. 7A and 7B are views for illustrating a configuration and operation of a signal detection circuit according to a first embodiment. As illustrated in FIG. 7A, the signal detection circuit 50 of the first embodiment includes optical filters 51a and 51b, photo detectors 52a and 52b, DC-removal capacitors 53a and 53b, a difference circuit 54, and a detector 55.

As described above, the FSK-SV signal is multiplexed into the input optical signal by frequency modulation in the optical transmitter. For this reason, as illustrated in FIG. 7B, the center wavelength of the optical signal is changed in the range between λc−Δλ and λc+Δλ according to the FSK-SV signal. The input optical signal is guided to the optical filters 51a and 51b.

Each of the optical filters 51a and 51b is a band pass filter. As illustrated in FIG. 7B, the transmission band (or pass band) of the optical filter 51a is arranged on the long wavelength side with respect to the center wavelength λc of the spectrum of the optical signal. The transmission band (or pass band) of the optical filter 51b is arranged on the short wavelength side with respect to the center wavelength λc of the spectrum of the optical signal. In this example, the transmission bands of the optical filters 51a and 51b are arranged symmetrically with respect to the center wavelength λc of the spectrum of the optical signal. Further, in this example, the width of the transmission band of the optical filter 51a is the same as or substantially the same as the width of the transmission band of the optical filter 51b.

The photo detector 52a converts the output light of the optical filter 51a (that is, the optical signal filtered by the optical filter 51a) into an electrical signal. The electrical signal represents the power of the output light of the optical filter 51a. The power of the output light of the optical filter 51a is represented by the area of the hatched region illustrated in FIG. 7B. That is, when the center wavelength of the optical signal is λc−Δλ, the power of the output light of the optical filter 51a is expressed as Pa1, and when the center wavelength of the optical signal is Δc+Δλ, the power of the output light of the optical filter 51a is expressed as Pa2.

Similarly, the photo detector 52b converts output light of the optical filter 51b (that is, an optical signal filtered by the optical filter 51b) into an electrical signal. The electrical signal represents the power of the output light of the optical filter 51b. In FIG. 7B, when the center wavelength of the optical signal is λc−Δλ, the power of the output light of the optical filter 51b is expressed as Pb1, and when the center wavelength of the optical signal is λc+Δλ, the power of the output light of the optical filter 51b is expressed as Pb2.

The DC-removal capacitor 53a removes DC component from the electrical signal generated by the photo detector 52a. Therefore, the electrical signal outputted from the DC-removal capacitor 53a represents the FSK-SV signal which is converted into an amplitude component by using the optical filter 51a. Similarly, DC-removal capacitor 53b removes DC component from the electrical signal generated by the photo detector 52b. Therefore, the electrical signal outputted from the DC-removal capacitor 53b represents the FSK-SV signal which is converted into an amplitude component by using the optical filter 51b. Note that the data signal is assumed to be averaged, for example, by a low pass filter (not illustrated). Alternatively, when the operation speed of the photo detectors 52a and 52b is sufficiently low as compared with the symbol rate of the data signal, the data signal is averaged by the photo detectors 52a and 52b. The averaged data signal is substantially removed by the DC-removal capacitors 53a and 53b.

The difference circuit 54 generates a difference signal between the output signal (hereinafter referred to as signal Pa) of the DC-removal capacitor 53a, and the output signal (hereinafter referred to as signal Pb) of the DC-removal capacitor 53b. In this example, the difference circuit 54 subtracts the signal Pb from the signal Pa. Note that the difference circuit 54 is realized, for example, by an analog circuit which outputs a current difference between two input signals or a voltage difference between two input signals. The detector 55 detects the FSK-SV signal from the difference signal obtained by the difference circuit 54. For example, when the voltage of the difference signal is larger than a specified threshold, "1" is outputted, and when the voltage of the difference signal is equal to or smaller than the threshold, "0" is outputted.

The signal Pa is expressed by the following expression. In the expression, Psv(a) represents the amplitude component resulting from the FSK-SV signal included in the output light of the optical filter 51a. Further, Pam_noise(a) represents AM noise included in the output light of the optical filter 51a.

$$Pa=Psv(a)+Pam\_noise(a)$$

Similarly, the signal Pb is expressed by the following expression. In the expression, Psv(b) represents the amplitude component resulting from the FSK-SV signal included in the output light of the optical filter 51b. Further, Pam_noise (b) represents AM noise included in the output light of the optical filter 51b.

$$Pb=Psv(b)+Pam\_noise(b)$$

Here, the transmission band of the optical filter 51a is provided on the long wavelength side with respect to the center wavelength λc of the spectrum of the optical signal, and the transmission band of the optical filter 51b is provided on the short wavelength side with respect to the center wavelength λc. Therefore, when the power of light transmitted through the optical filter 51a is increased, the power of light transmitted through the optical filter 51b is reduced. On the other hand, when the power of light transmitted through the optical filter 51a is reduced, the power of light transmitted through the optical filter 51b is increased. That is, the signal Psv(a) and the signal Psv(b) are opposite in phase to each other.

The transmission bands of the optical filters 51a and 51b are arranged symmetrically with respect to the center wavelength λc of the spectrum of the optical signal. In addition, the width of the transmission band of the optical filter 51a is the same as or substantially the same as the width of the transmission band of the optical filter 51b. Therefore, the following relationship is obtained.

Psv(a)=−Psv(b)=Psv

Pam_noise(a)=Pam_noise(b)=Pam_noise

Therefore, the output signal Pout of the difference circuit 54 is expressed by the following expression.

$$Pout = Pa - Pb$$
$$= (Psv + Pam\_noise) - (-Psv + Pam\_noise)$$
$$= 2Psv$$

In this way, the AM noise included in the output light of the optical filter 51a, and the AM noise included in the output light of the optical filter 51b are cancelled with each other in the difference circuit 54. In practice, the AM noise is not completely cancelled in the difference circuit 54. However, the AM noise is sufficiently suppressed in the difference circuit 54.

As a result, the detector 55 can detect, with sufficient accuracy, the amplitude component resulting from the FSK-SV signal from the signal Pout outputted from the difference circuit 54. That is, the signal detection circuit 50 of the first embodiment can detect the FSK-SV signal from the input optical signal with sufficient accuracy.

FIG. 8 is a view for illustrating the effect of the first embodiment. In FIG. 8, the horizontal axis represents the offset frequency of the average value between the center frequency of optical filter 53a and the center frequency of the optical filter 53b for characteristic 2. In addition, the horizontal axis also represents the offset frequency of the optical filter (prior art depicted in FIG. 5A) for characteristics 1. The vertical axis represents CNR (Carrier-to-Noise Ratio). The characteristic 1 represents the CNR about the FSK-SV signal defected by the signal detection circuit illustrated in FIG. 5A. The characteristic 2 represents the CNR about the FSK-SV signal detected by the signal detection circuit 50 of the first embodiment illustrated in FIG. 7A. Note that, in the signal detection circuit 50, the difference between the center wavelengths of the transmission bands of the optical filters 51a and 51b is 24 GHz.

As illustrated in FIG. 8, at least when the offset frequency is small, a large CNR is obtained in the signal detection circuit 50 of the first embodiment as compared with the CNR obtained in the configuration illustrated in FIG. 5A. Therefore, by means of the configuration of the first embodiment, the FSK-SV signal can be detected with sufficient accuracy from the input optical signal.

Figure 9A:
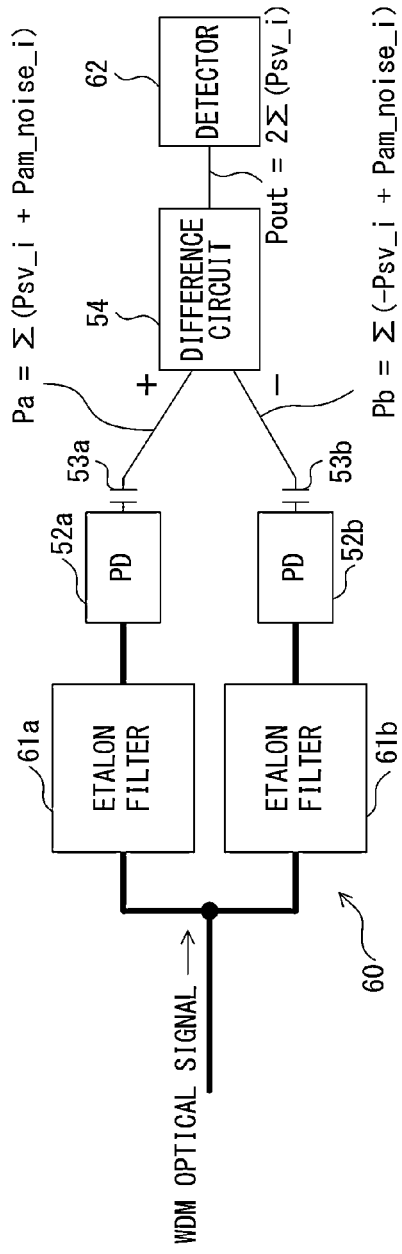
FIGS. 9A and 9B are views for illustrating a configuration and operation of a signal detection circuit of a second embodiment.
Figure 9B:
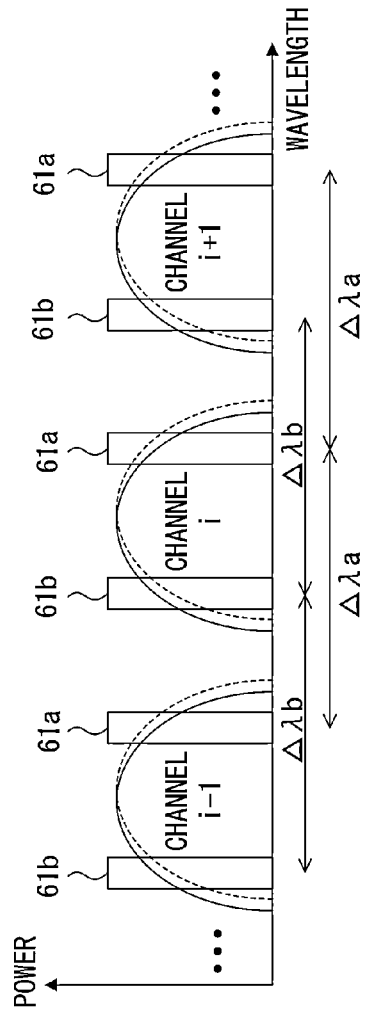

FIGS. 9A and 9B are views for illustrating a configuration and operation of a signal detection circuit according to a second embodiment. As illustrated in FIG. 9A, the signal detection circuit 60 of the second embodiment includes etalon filters 61a and 61b, the photo detectors 52a and 52b, the DC-removal capacitors 53a and 53b, the difference circuit 54, and a detector 62. FIG. 9B illustrates a spectrum of each channel of a WDM optical signal. Note that the spectrum of each channel, that is illustrated in a duplicated manner using the solid line and the broken line, represents the state in which the spectrum is changed by an FSK-SV signal.

In this example, the respective channels of the input WDM optical signal are arranged at a fixed wavelength spacing or a substantially fixed wavelength spacing. As an example, the respective channels are arranged at the spacing of 50 GHz. Further, an FSK-SV signal is multiplexed into the optical signal of each of the channels.

The optical transmittance of the etalon filters 61a and 61b is changed substantially periodically with respect to the wavelength. That is, as illustrated in FIG. 9B, the etalon filter 61a has transmission bands at the spacing of Δλa. Similarly, the etalon filter 61b has transmission bands at the spacing of Δλb. The width of Δλa is substantially equal to the width of Δλb. Further, each of Δλa and Δλb is substantially equal to the spacing at which the respective channels of the input WDM optical signal are arranged.

As illustrated in FIG. 9B, the etalon filter 61a is controlled so that the transmission band thereof is arranged on the long wavelength side of the center wavelength of the spectrum of each channel of the WDM optical signal. Similarly, the etalon filter 61b is controlled so that the transmission band thereof is arranged on the short wavelength side of the center wavelength of the spectrum of each channel of the WDM optical signal. In each channel, the transmission bands of the etalon filters 61a and 61b are arranged symmetrically with respect to the center wavelength of the spectrum of the optical signal. Further, the width of the transmission band of the etalon filter 61a is the same as or substantially the same as the width of the transmission band of the etalon filter 61b.

When the etalon filters 61a and 61b are controlled as described above, the components extracted from respective channels of the WDM optical signal are substantially the same as those in the first embodiment illustrated in FIGS. 7A and 7B. That is, the signal Pa inputted to the difference circuit 54 from the etalon filter 61a, the photo detector 52a, and the DC-removal capacitor 53a is expressed as follows. Note that "i" is used to identify each channel of the WDM optical signal.

$$Pa = \Sigma(Psv\_i + Pam\_noise\_i)$$

Similarly, the signal Pb inputted to the difference circuit 54 from the etalon filter 61b, the photo detector 52b, and the DC-removal capacitor 53b is expressed as follows.

$$Pb = \Sigma(-Psv\_i + Pam\_noise\_i)$$

Note that Psv_i represents the amplitude component resulting from the FSK-SV signal in the channel i. Further, Pam_noise_i represents AM noise in the channel i. The symbol Σ is an operator that calculates the total sum for all the channels of the WDM optical signal.

Therefore, the output signal Pout of the difference circuit 54 is expressed by the following expression.

$$Pout = Pa - Pb$$
$$= \left(\sum (Psv\_i + Pam\_noise\_i)\right) - \left(\sum (-Psv\_i + Pam\_noise\_i)\right)$$
$$= 2\sum Psv\_i$$

In this way, also in the second embodiment, the AM noise included in the output light of the optical filter 61a, and the AM noise included in the output light of the optical filter 61b are cancelled with each other or suppressed in the difference circuit 54. As a result, the detector 62 can detect, with sufficient accuracy, the amplitude component resulting from the FSK-SV signal from the signal Pout outputted from the difference circuit 54. That is, the signal detection circuit 60 of the second embodiment can detect the FSK-SV signal from the optical signal of the input WDM signal with sufficient accuracy.

FIG. 10 illustrates an example of the detector 62. The detector 62 detects the FSK-SV signal from the signal Pout outputted from the difference circuit 54. Here, the signal detection circuit 60 may detect the FSK-SV signal multiplexed into the optical signal of each of the channels of the WDM optical signal.

In this example, the FSK-SV signal is realized by codes orthogonal to each other. The WDM optical signal is assumed to include m wavelength channels. In this case, the detector 62 includes a sampler 71, shift registers 72-1 to 72-m, correlators 73-1 to 73-m, decision units 74-1 to 74-m. Note that, when the input WDM optical signal is generated by the WDM transmission equipment illustrated in FIG. 2, the relation of m=n is preferred.

The sampler 71 samples the signal Pout outputted from the difference circuit 54. The frequency of the sampling clock is the same as, for example, the bit rate (or chip rate) of the code representing the FSK-SV signal. The sampled data string obtained by the sampler 71 is guided to the shift registers 72-1 to 72-m. The length of the shift registers 72-1 to 72-m is the same as the bit length of the code representing the FSK-SV signal.

The correlators 73-1 to 73-m are provided with corresponding codes 1 to m, respectively. The codes 1 to m are givers, for example, from the network management system 10 illustrated in FIG. 1. Each of the codes 1 to m is the code which is expected to be multiplexed into the optical signal of the input WDM optical signal. Each of the correlators 73-1 to 73-m calculates correlation between respective codes 1 to m and the sampled data string stored in respective shift registers 72-1 to 72-m. Note that the contents of the codes 1 to m are not fixed information but represent parallel numbers simultaneously processed in the signal processing performed by the detector 62. The total number of code information managed by the network management system 10 illustrated in FIG. 1 is generally larger than m.

The decision units 74-1 to 74-m compare a threshold with the correlation value calculated by respective correlators 73-1 to 73-m. Each of the decision units 74-1 to 74-m determines whether or not corresponding code (1 to m) is detected based on the result of the comparison. For example, when the correlation value calculated by the correlator 73-1 is larger than the threshold, the decision unit 74-1 extracts the FSK-SV signal from the channel 1 of the input WDM optical signal.

FIG. 11 illustrates a configuration of a signal detection circuit of a third embodiment. The signal detection circuit 80 of the third embodiment includes the optical filters 51a and 51b, the photo detectors 32a and 32b, the DC-removal capacitors 53a and 53b, the difference circuit 54, the detector 55, and an amplitude adjustment circuit 81.

The shape of the spectrum of the input optical signal may become unsymmetrical with respect to the center wavelength. For example, the shape of the spectrum of the optical signal may become unsymmetrical due to the influence of Pass Band Narrowing caused by the ROADM of FIG. 1, and the like. In this case, for example, in the first embodiment illustrated in FIGS. 7A and 7B, the AM noise may not be cancelled. Thus, the signal defection apparatus 80 of the third embodiment includes the amplitude adjustment circuit 81 that adjusts the amplitude of one of the input signals of the difference circuit 54. The amplitude adjustment circuit 81 multiplies the amplitude of the input signal by α. The amplitude adjustment circuit 81 is realized, for example, by an amplifier or an attenuator.

The signal Pa generated by the optical filter 51a, the photo detector 52a, the DC-removal capacitor 53a, and the amplitude adjustment circuit 81 in the signal detection circuit 80 is expressed as follows.

$$Pa = \alpha(Psv(a) + Pam\_noise(a))$$

On the other hand, the signal Pb generated by the optical filter 51b, the photo detector 52b, and the DC-removal capacitor 53b is expressed as follows.

$$Pb = Psv(b) + Pam\_noise(b)$$

Here, if is assumed that the shape of the spectrum of the input optical signal is known by measurement, and the like. In this case, the constant α is determined so as to satisfy the relation that α Pam_noise(a)=Pam_noise(b). When the constant α is determined in this way, the signal Pout outputted from the difference circuit 54 is expressed by the following expression.

$$Pout = Pa - Pb$$
$$= (\alpha(Psv(a) + \text{Pam\_noise}(a))) - (-Psv(b) + \text{Pam\_noise}(b))$$
$$= \alpha Psv(a) + Psv(b)$$

Further, when Psv(a)=Psv(b)=Psv, a relation of Pout=(α+1) Psv is obtained.

In this way, in the third embodiment, even when the shape of the spectrum of the input optical signal is unsymmetrical with respect to the center wavelength, the AM noise is sufficiently suppressed. Therefore, the signal detection circuit 80 of the third embodiment can detect the FSK-SV signal from the input optical signal with sufficient accuracy.

Figure 12A:
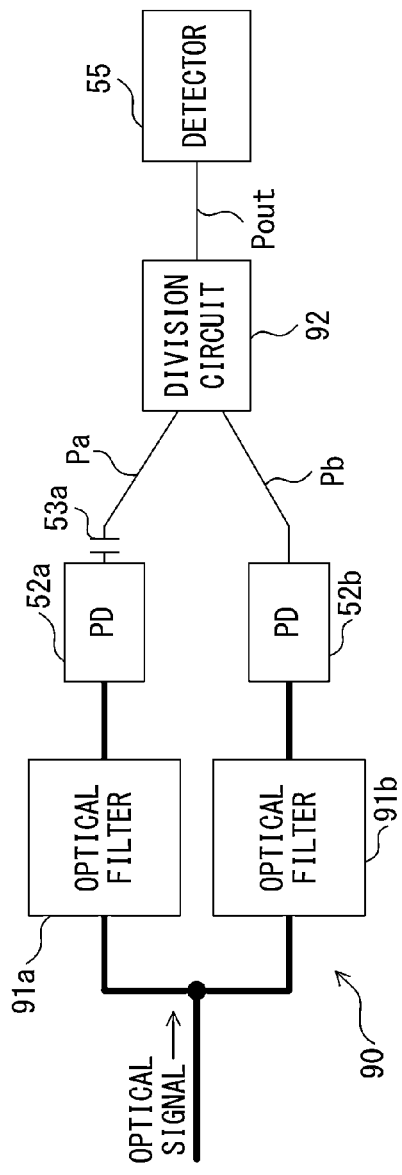
FIGS. 12A and 12B are views for illustrating a configuration and operation of a signal detection circuit of a fourth embodiment.
Figure 12B:
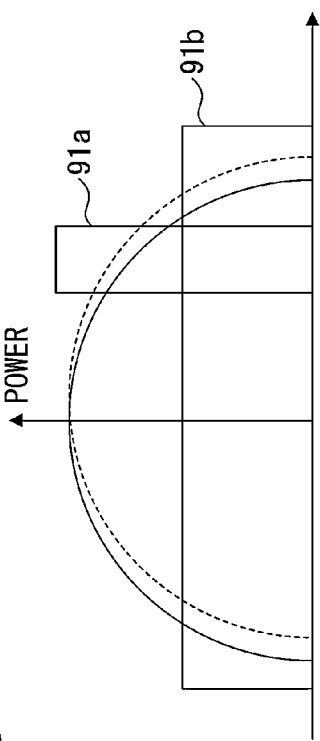

FIGS. 12A and 12B are views for illustrating a configuration and operation of a signal detection circuit according to a fourth embodiment. As illustrated in FIG. 12A, the signal detection circuit 90 of the fourth embodiment includes optical filters 91a and 91b, the photo detectors 52a and 52b, the DC-removal capacitor 53a, a division circuit 92, and the detector 55.

The optical filter 91a is the same as the optical filter 51a or 51b illustrated in FIG. 7A. That is, the transmission band of the optical filter 91a is arranged on the long wavelength side or the short wavelength side with respect to the center wavelength λc of the spectrum of the optical signal. In the example illustrated in FIG. 12B, the transmission band of the optical filter 91a is arranged on the long wavelength side with respect to the center wavelength λc of the spectrum of the optical signal. On the ether hand, the optical filter 91b is a band pass filter which transmits the entire band of the spectrum of the optical signal.

In this way, the optical filter 91b transmits the entire band of the spectrum of the optical signal, and hence the power of the light outputted from the optical filter 91b is not influenced by the FSK-SV signal. Therefore, the signal Pb generated by the optical filter 91b and the photo detector 52b can be expressed as follows. In this expression, Ps denotes the signal component (the data signal and the FSK-SV signal) of the input optical signal. Further, Pnoise denotes the noise component of the input optical signal.

$$Pb = Ps + Pnoise$$

On the other hand, the optical filter 91a extracts a part of the spectrum of the optical signal, and hence the power of the output signal of the optical filter 91a is proportional to the power of the output signal of the optical filter 91b. In the following, this proportionality coefficient is set to "k". This proportionality coefficient satisfies a relation of 0<k<1. Especially, when the width of the transmission band of the optical filter 91a is narrow, k satisfies a relation of 0<k<<1. Further, the DC component of the output signal of the optical filter 91a is removed by the DC-removal capacitor 53a. Therefore, the signal Pa generated by the optical filter 91a, the photo detector 52a, and the DC-removal capacitor 53a can be expressed as follows. Note that Psv' represents a ratio of the amplitude component resulting from the FSK-SV signal to the signal Pb.

$$Pa = Psv' \times k \times (Ps + Pnoise)$$

The division circuit 92 divides the signal Pa by the signal Pb. Note that the division circuit 92 is realized, for example, by an analog circuit which outputs a signal representing the current ratio of two input signals, or which outputs a signal representing the voltage ratio of two input signals. Therefore, the signal Pout outputted from the division circuit 92 is expressed as follows.

$$Pout = Pa / Pb$$
$$= (Psv' \times k \times (Ps + Pnoise)) / (Ps + Pnoise)$$
$$= k \times Psv'$$

In this way, the noise included in the output light of the optical filter 91a and the noise included in the output light of the optical filter 91b are removed in the division circuit 92. In practice, the noise is not completely removed in the division circuit 92. However, the noise is sufficiently suppressed in the division circuit 92.

Therefore, the detector 55 can detect, with sufficient accuracy, the amplitude component resulting from the FSK-SV signal from the signal Pout outputted from the division circuit 92. That is, the signal detection circuit 90 of the fourth embodiment can detect the FSK-SV signal from the input optical signal with sufficient accuracy.

Note that, in the example illustrated in FIGS. 12A and 12B, the optical filter 91b transmits the entire band of the spectrum of the optical signal. However, the fourth embodiment is not limited to this configuration. That is, instead of the optical filter 91b which transmits the entire band of the spectrum of the optical signal, it may also be configured to use an optical filter 91c which transmits, as illustrated in FIG. 13, a part of the band of the spectrum of the optical signal. However, in this case, it is preferred that, as illustrated in FIG. 13, the optical filter 91c transmit wavelength components symmetrically with respect to the center wavelength of the spectrum of the optical signal.

When the transmission band of the optical filter 91c is symmetrical with respect to the center wavelength of the spectrum of the optical signal, the power of the signal outputted from the optical filter 91c is hardly changed by the FSK-SV signal. Therefore, also in this case, the signal Pout outputted from the division circuit 92 is expressed by the following expression.

$$Pout = k \times Psv$$

However, in the examples illustrated in FIG. 12A and FIG. 13, the proportionality coefficients k are different from each other.

<Control Method>

In each of the signal detection circuit 50 illustrated in FIG. 7A, the signal detection circuit 80 illustrated in FIG. 11, and the signal detection circuit 90 illustrated in FIG. 12A, the operation mode is controlled, for example, by the following procedures.

(1) While the spacing between the center wavelengths of a pair of optical filters is maintained at a constant value, the transmission bands of the pair of optical filters is swept in the wavelength region in which an object optical signal is arranged.
(2) In the sweep operation, a wavelength, at which the amplitude of the signal Pout or the signal to noise ratio of the signal Pout reaches a peak, is detected.
(3) In the state in which the pair of optical filters is controlled to correspond to the wavelength defected in the procedure (2), the spacing between the center wavelengths of the pair of optical filters is finely adjusted so that the amplitude of the signal Pout or the signal to noise ratio of the signal Pout reaches a peak.

The spacing between the center wavelengths of the pair of optical filters is determined based on, for example, the rate, the modulation scheme, and the like, of the data signal carried by the target optical signal. For example, in the case in which the modulation scheme of the data signal is 16 QAM, in which the rate of the data signal is 31.5 G symbol/second, and in which the width of the transmission band of each of the optical filters is 20 GHz, the spacing between the center wavelengths of the pair of optical filters is about 24G Hz in FIG. 7A and FIG. 11 and is about 12 GHz in FIG. 12A. Note that the procedure (3) described above may be omitted.

The method for realizing the above-described procedure (1) is realized, for example, by any one of the following methods.
(a) When each of the optical filters is a Fabry-Perot etalon filter, the two optical filters are mounted on a rotating stage. The two optical filters are arranged at angles slightly different from each other. An input WDM optical signal is split to be a pair of optical beams substantially in parallel with each other. The pair of optical beams are respectively inputted to optical filters. The rotating stage is rotated while the angular difference between the two optical filters is maintained.
(b) When the transmission characteristic of each of the optical filters is dependent on temperature, temperature control is performed while the difference between the temperature of one of the optical filters, and the temperature of the other of the optical filters is maintained at a fixed value.
(c) When the transmission characteristics of the optical filters can be controlled according to the change in the refractive index due to electro-optical effect, voltage control is performed while the difference between the applied voltage of one of the optical filters, and the applied voltage of the other of the optical filters is maintained at a fixed value.
(d) The light waves outputted from the optical filters is combined, and the combined light waves is converted into an electrical signal. Then, the transmission wavelength of each of the optical filters is controlled while the beat frequency of the obtained electric signal is maintained at a fixed value.
(e) When a wavelength selective switch (WSS) is used, the output wavelength of each of the two output ports thereof is controlled while the spacing between the output wavelengths of the two output ports is maintained at a fixed value. For example, in a wavelength selective switch using a LCOS (Liquid Crystal On Silicon) element, the control of output wavelength is realized by controlling the pixel of the LCOS element.

In the signal detection circuit 60 illustrated in FIG. 9A, the operation mode is controlled, for example, by the following procedures.
(1) While the spacing between the center wavelengths of a pair of optical filters is maintained at a fixed value, the transmission bands of the pair of optical filters is swept in the wavelength region in which a WDM optical signal is arranged.
(2) In the sweep operation, a wavelength, at which the amplitude of the signal Pout or the signal to noise ratio of the signal Pout reaches a peak, is detected.
(3) In the state in which the pair of optical filters is controlled to correspond to the wavelength detected in the procedure (2), the spacing between the center wavelengths of the pair of optical filters is finely adjusted so that the amplitude of the signal Pout or the signal to noise ratio of the signal Pout reaches a peak.

<Optical Transmission Equipment>

Figure 14:
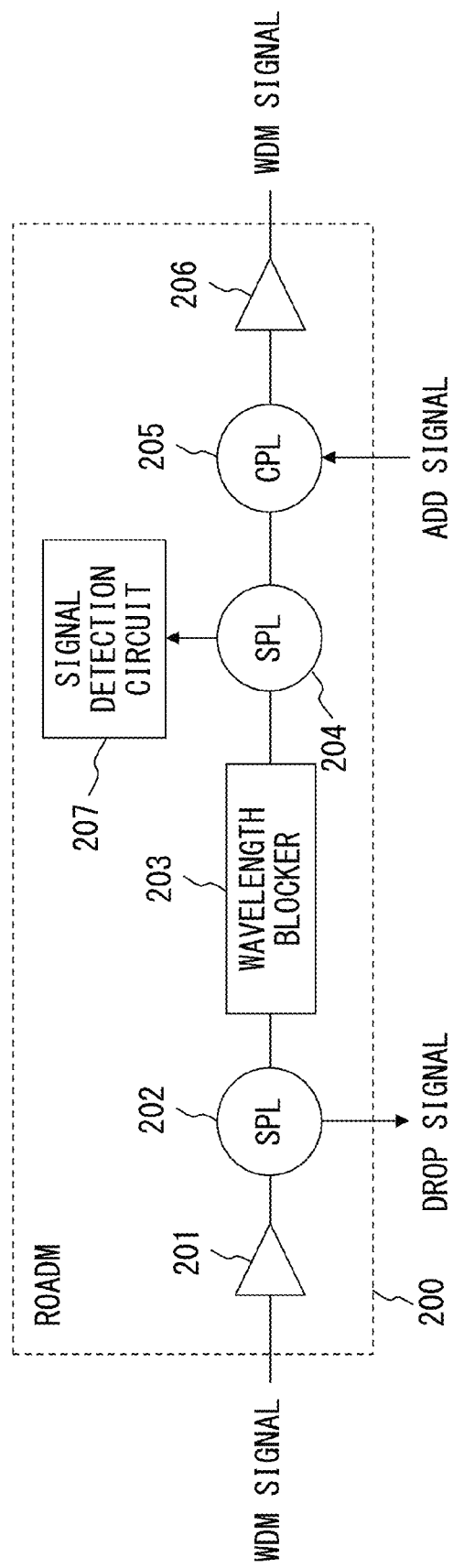
FIG. 14 illustrates an example of optical transmission equipment that includes a signal detection circuit.

FIG. 14 illustrates an example of optical transmission equipment that includes a signal detection circuit for detecting an FSK-SV signal. The optical transmission equipment is a ROADM 200 in the example illustrated in FIG. 14. The ROADM 200 includes an optical amplifier 201, an optical splitter 202, a wavelength blocker 203, an optical splitter 204, an optical coupler 205, an optical amplifier 206, and a signal detection circuit 207. The signal detection circuit 207 may be realized by one of the signal detection apparatuses 50, 60, 80, 90 and 100 described above.

The optical amplifier 201 amplifies an input WDM optical signal. The optical splitter 292 guides the WDM optical signal amplified by the optical amplifier 201 to the wavelength blocker 203, and also branches the WDM signal to generate a drop signal. The drop signal is guided to, for example, a wavelength selective device or a demultiplexer (both not illustrated). The wavelength selective device selects a specified wavelength from the drop signal and guides the selected signal to a client terminal. The demultiplexer separates the drop signal for each wavelength. In this case, a part of or all of the plurality of optical signals obtained by the demultiplexer may be guided to the client terminal.

According to, for example, an instruction from the network management system 10, the wavelength blocker 203 transmits a specified wavelength included in the input WDM optical signal and blocks the other wavelength. The optical splitter 204 branches the optical signal outputted from the wavelength blocker 203, and guides the branched signals to the optical coupler 205 and the signal detection circuit 207. The optical coupler 205 generates an output WDM optical signal by adding an add signal to the optical signal outputted from the optical splitter 204. The add signal is transmitted, for example, from a client terminal. The optical amplifier 206 amplifies the WDM optical signal outputted from the optical coupler 205. Note that the ROADM 200 may be configured to include a wavelength selective switch instead of the wavelength blocker 203 illustrated in FIG. 14.

The operations of the signal detection circuit 207 are performed in such a mariner as described with reference to FIG. 7A to FIG. 13. That is, the signal detection circuit 207 detects the FSK-SV signal from each of the channels of the WDM optical signal guided from the optical splitter 204.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A signal detection circuit comprising:
   a first optical filter configured to filter an optical signal carrying data signal and a frequency modulated signal with a first transmission band;
   a second optical filter configured to filter the optical signal with a second transmission band;
   a first photo detector configured to convert the output light of the first optical filter into a first electrical signal;

a second photo detector configured to convert the output light of the second optical filter into a second electrical signal;

a difference circuit configured to output a signal representing a difference between the first electrical signal and the second electrical signal; and a detector configured to detect the frequency modulated signal based on the output signal of the difference circuit, wherein a spectrum of the optical signal has a width corresponding to at least one of a data rate and a modulation format of the data signal, the first transmission band is arranged on the longer wavelength side with respect to the center wavelength of the spectrum of the optical signal so as to pass a part of the spectrum of the optical signal on the longer wavelength side with respect to the center wavelength of the spectrum, the second transmission band is arranged on the shorter wavelength side with respect to the center wavelength of the spectrum of the optical signal so as to pass a part of the spectrum of the optical signal on the shorter wavelength side with respect to the center wavelength of the spectrum.

2. The signal detection circuit according to claim 1, wherein the first and second transmission bands are arranged substantially symmetrically with respect to the center wavelength of the spectrum of the optical signal.

3. The signal detection circuit according to claim 1, further comprising:

a first DC component removal circuit configured to remove a DC component of the first electrical signal; and a second DC component removal circuit configured to remove a DC component of the second electrical signal.

4. The signal detection circuit according to claim 1, further comprising an amplitude adjustment circuit configured to adjust an amplitude of at least one of the first electrical signal and the second electrical signal.

5. Optical transmission equipment comprising:

a first optical filter configured to filter an optical signal carrying data signal and a frequency modulated signal with a first transmission band;

a second optical filter configured to filter the optical signal with a second transmission band;

a first photo detector configured to convert the output light of the first optical filter into a first electrical signal;

a second photo detector configured to convert the output light of the second optical filter into a second electrical signal;

a difference circuit configured to output a signal representing a difference between the first electrical signal and the second electrical signal; and a detector configured to detect the frequency modulated signal based on the output signal of the difference circuit, wherein a spectrum of the optical signal has a width corresponding to at least one of a data rate and a modulation format of the data signal, the first transmission band is arranged on the longer wavelength side with respect to the center wavelength of the spectrum of the optical signal so as to pass a part of the spectrum of the optical signal on the longer wavelength side with respect to the center wavelength of the spectrum, the second transmission band is arranged on the shorter wavelength side with respect to the center wavelength of the spectrum of the optical signal so as to pass a part of the spectrum of the optical signal on the shorter wavelength side with respect to the center wavelength of the spectrum.

6. The signal detection circuit according to claim 1, wherein a width of the first transmission band and a width of the second transmission band are respectively narrower than the width of the spectrum of the optical signal.

* * * * *